(12) United States Patent
Schöler et al.

(10) Patent No.: US 11,499,850 B2
(45) Date of Patent: Nov. 15, 2022

(54) SENSOR ASSEMBLY FOR A PRODUCTION APPARATUS AND METHOD FOR TRANSFERRING A SENSOR INTO AND OUT OF A HOUSING OF A PRODUCTION APPARATUS

(71) Applicant: Fette Compacting GmbH, Schwarzenbek (DE)

(72) Inventors: Martin Schöler, Hamburg (DE); Benjamin Nehls, Giesensdorf (DE); Marcel Issmer, Hamburg (DE)

(73) Assignee: Fette Compacting GmbH, Schwarzenbek (DE)

( * ) Notice: Subject to any disclaimer, the term of this patent is extended or adjusted under 35 U.S.C. 154(b) by 0 days.

(21) Appl. No.: 17/490,053

(22) Filed: Sep. 30, 2021

(65) Prior Publication Data
US 2022/0107210 A1    Apr. 7, 2022

(30) Foreign Application Priority Data

Oct. 1, 2020    (DE) .................... 10 2020 125 653.1

(51) Int. Cl.
*G01D 11/24* (2006.01)
*B65B 51/04* (2006.01)

(52) U.S. Cl.
CPC ............ *G01D 11/245* (2013.01); *B65B 51/04* (2013.01)

(58) Field of Classification Search
CPC ....... G01D 11/245; G01D 11/24; B65B 51/04
See application file for complete search history.

(56) References Cited

U.S. PATENT DOCUMENTS 8,511,160 B2 * 8/2013 Herz .................... G01D 11/245
                                                    73/431

FOREIGN PATENT DOCUMENTS

| DE | 102005060676 A1 * | 6/2007 | .......... F15B 15/2861 |
| DE | 102005060676 A1 | 6/2007 | |
| DE | 102016202315 A1 * | 8/2017 | ............ G01D 11/24 |
| DE | 102016202315 A1 | 8/2017 | |
| EP | 1 568 480 B1 | 8/2005 | |

OTHER PUBLICATIONS

EP 20210197732; filed Sep. 20, 2021; EP Search Report dated Feb. 25, 2022 (8 pages).

* cited by examiner

*Primary Examiner* — Jamel E Williams
(74) *Attorney, Agent, or Firm* — Barclay Damon LLP

(57) ABSTRACT

A method for transferring a sensor of a production apparatus with a sensor assembly positioned in a housing includes connecting at least one of (1) supply lines, and (2) sensor signal lines to a sensor section of the sensor. A first end of a sealing sleeve is sealingly connected to a sealing section of the sensor. A second end of the sealing sleeve is sealingly connected to a sealing container. The sensor with the sealing sleeve are inserted into the sealing container. A first end of the sealing container is sealingly connected to an access opening defined by the housing of the production apparatus. The access opening is opened and the sensor is transferred from the sealing container to an interior of the housing.

19 Claims, 4 Drawing Sheets

SENSOR ASSEMBLY FOR A PRODUCTION APPARATUS AND METHOD FOR TRANSFERRING A SENSOR INTO AND OUT OF A HOUSING OF A PRODUCTION APPARATUS

CROSS REFERENCE TO RELATED INVENTION

This application is based upon and claims priority to, under relevant sections of 35 U.S.C. § 119, German Patent Application No. 10 2020 125 653.1, filed Oct. 1, 2020, the entire contents of which is hereby incorporated by reference.

FIELD OF TECHNOLOGY

The disclosure is directed to a sensor assembly for a production apparatus comprising a sensor. The sensor comprises a transmitting and/or receiving section for transmitting and/or receiving sensor signals, and a sensor section. The disclosure is also directed to a production apparatus as well as a method for transferring a sensor into a housing of a production apparatus and out of a housing of a production apparatus.

BACKGROUND

Production apparatuses of the type at issue here can for example be rotary tablet presses, capsule filling machines or isolators for rotary tablet presses or capsule filling machines. In rotary tablet presses, for example, powder material added to cavities of a die plate is pressed into pellets by means of upper and lower punches. The produced tablets are generally conveyed by the lower punch to the top side of the die plate and for example scraped off of the die plate for example by a scraping element and supplied to one or more outlets of the rotary tablet press.

It is known for example from EP 1 568 480 B1 to monitor tablets produced in rotary tablet presses with spectroscopic sensors, for example NIR sensors (near infrared sensors), for example for the active ingredient content. It is also known to monitor the powder product to be processed in the rotary tablet press before being pressed into the cavities for example in a filling apparatus that regularly adds the powder product under gravity to the cavities of the die plate from a filling chamber. With spectroscopic measuring methods, for example the desired mixing ratio of active pharmaceutical ingredients (API) and excipients or lubricants can be reliably monitored. In general, sensors at issue here are also termed PAT sensors (process analytical technology sensors).

Recently, so-called containment production apparatuses have significantly gained in importance. With such production apparatuses, design measures have been pursued to minimize an exit of product dust from the production apparatus into the environment. This is in particular of major importance in processing pharmaceutical active ingredients and with respect to the protection of the operating personnel. For a given production apparatus and the given production conditions, a containment level can be defined according to the so-called SMEPAC test (standardized measurement of equipment particulate airborne concentration). Production apparatuses of the type at issue here can for example have a containment level according to the SMEPAC test of OEB 3 or higher. Such production apparatuses have a housing that is designed to be tight against the environment in order to achieve the desired containment level. An access to the interior of the housing should be correspondingly avoided as much as possible. To the extent that access is necessary, access openings that are specially provided for this can be provided such as so-called rapid transfer ports.

Sensors to be used in puncture apparatuses, for example sensors that work by spectroscopy, must be arranged in the housing of the production apparatus for measurement. They therefore necessarily come into contact with product dust located in the housing interior. When the sensor is later removed from the housing, it must correspondingly be cleaned for sufficient decontamination. Known sensors do not however possess a sufficient protection class for wet cleaning, i.e., cleaning with a cleaning fluid that is normally used for decontamination. In addition, known sensors frequently possess a surface that is difficult to clean, for example a ribbed or otherwise contoured surface. At the same time, when operating containment production apparatuses, the goal after the end of production is to remove all e.g. residual pharmaceutical product from the production apparatus without contaminating an operator or the environment of the production apparatus. This is correspondingly only feasible if a sensor arranged in the housing interior is cleaned together with the other components arranged in the housing interior, which is impossible with the known sensors for the explained reasons. Until now, this has prevented the use of PAT sensors in containment production apparatuses, or respectively this would permit such use only with a greatly increased expenditure of time.

Starting from the explained prior art, the object of the invention is to provide a sensor assembly and method of the aforementioned type that permit safe use in containment production apparatuses without a greatly increased expenditure of time.

BRIEF SUMMARY OF THE INVENTION

For a sensor assembly of the aforementioned type, the invention achieves the object in that the sensor has a sealing section between the transmitting and/or receiving section and the sensor section to which a sealing sleeve is sealingly fastened by a first end. A sealing container is provided that is configured to be sealingly fastened by a first end to an access opening of a housing of a production apparatus. The sensor can be accommodated in the sealing container for a transfer into the interior of the housing and out of the housing, and the sealing sleeve is sealingly fastened by a second end to the sealing container so that the sensor, when the sealing container is in a state fastened to the access opening of housing, can be transferred out of the sealing container into the interior of the housing and out of the interior of the housing into the sealing container. The sealing sleeve ensures a tight separation between the sensor section and the interior of the housing during the transfer.

In an embodiment, the production apparatus can for example be a tablet press such as a rotary tablet press, a capsule filling machine, or an isolator for a tablet press or a capsule filling machine. Such an isolator is frequently downstream from a tablet press or a capsule filling machine and receives tablets or capsules produced in the tablet press or the capsule filling machine and performs additional production steps such as dust removal and/or (another) measuring investigation. In a capsule filling machine, capsules are filled with product such as powder product or pellets, as is known. To accomplish this, the capsule filling machine is supplied with capsules consisting of two halves, one of the capsule halves is filled with the particular product, and the capsules are closed by joining the capsule halves. For example in rotary tablet presses, frequently powdered product is processed such as for example active pharmaceutical ingredients (API), excipients and/or lubricants. The powder material to be processed is supplied by a filling machine to cavities of a die plate, for example under gravity. In the cavities, the powder material is pressed in a known manner into tablets by the upper and lower punches of the press. The cavities can be directly formed by holes in the die plate. However, removably fastened die sleeves in which the cavities are formed may also be arranged in the die plate. The die plate can be formed by a one-part ring disk or can be constructed from ring segments. After pressing the powder product in the cavities, the produced tablets are generally conveyed by the lower punch to the top side of the die plate and, as explained, scraped off for example by a knock-off apparatus and supplied to one or more outlets of the rotary tablet press.

The present invention is initially based on the concept of not necessarily cleaning the sensor within the press housing due to poor cleanability, but rather enabling removability from the press housing for cleaning at another location. In the prior art, no solution exists so far for introducing and removing a sensor under containment conditions, i.e., without breaching the containment of the production apparatus. This is where the present invention comes in. Initially, a sealing section is provided between a transmitting and/or receiving section and a sensor section of the sensor. In an embodiment, the transmitting and/or receiving section can be only a component that forwards sensor signals such as electromagnetic radiation and transmits them to a component to be monitored such as a powder product to be processed in the production apparatus or a produced product such as a tablet or capsule, or respectively records sensor signals coming from such a component and returns them. The transmitting and/or receiving section can for example possess a cylindrical shape. It can have a smooth outer contour that is correspondingly easy to clean. The sensor signals transmitted by the transmitting and/or receiving section come from the sensor section of the sensor, and the received sensor signals are forwarded to the sensor section. The sensor section can comprise at least one sensor element. It can however for example also have only optical elements for correspondingly forwarding electromagnetic radiation from another remote radiation transmitter to the transmitting and receiving section. A transmitter for sensor signals such as electromagnetic radiation can be arranged outside of the sensor section. The sensor signals can then for example be conducted by fiber-optic cable to the sensor section, and received sensor signals can in turn be sent by fiber-optic cable for further evaluation. In particular the sensor section is sensitive to cleaning for example with cleaning fluid. It generally does not have the necessary protection class. In addition, the sensor section frequently possesses a difficult to clean outer geometry, for example a highly contoured geometry with cooling ribs or the like that significantly impair cleaning.

In an embodiment, a sealing sleeve is provided that is sealingly fastened by a first end to the sealing section of the sensor. To the extent that "sealing", or respectively "tight" is mentioned in this context, it means that a sealing function exists against the passage of in particular dust so that passage of dust is at least minimized. Preferably, a dust-tight seal is achieved. For example, a containment level according to the SMEPAC test of OEB 3 or higher can be achieved. The sealing section can for example be designed annular. It can also comprise a sealing ring such as an O-ring.

While the first end of the sealing sleeve is held tightly on the sealing section, the second end of the sealing sleeve is tightly fastened to a sealing container. The sealing container possesses a first end with which it can be tightly fastened to an access opening of a housing of the production apparatus, and serves to transfer the sensor into the housing interior and out of the housing interior. The second end of the sealing sleeve can for example be held in the region of the first end on the sealing container, or respectively on the first end of the sealing container. For a transfer into the interior of housing, the sensor is inserted together with the sealing sleeve into the sealing container. Any supply and/or sensor signal lines, by means of which an electrical supply of the sensor section and/or a reception and transmission of sensor signals can occur, are connected to the sensor section and can for example be tightly guided through a second end of the sealing container for this purpose. The feedthrough can for example satisfy the protection class IP54 or IP67 depending on the requirement. With the sealing container placed at the access opening of the housing with the sensors arranged therein, the access opening of the housing can be opened for example through corresponding glove ports by an operator who can open the access opening from the interior of the housing using the glove ports without breaching the containment of the production apparatus. Then the sensor can be transferred from the sealing container into the interior of the housing, wherein this is also done from the interior of the housing, for example using the aforementioned glove ports. Then the access opening of the housing can be again closed. In reverse sequence, the sensor can be transferred from the interior of the housing back into the sealing container.

The sealing sleeve is inverted during the transfer. It always ensures a tight separation between the sensor section and the interior of the housing during the transfer. Also during production, the sealing sleeve remains fastened to the sensor section, or respectively the sealing container and therefore ensures a separation of the sensor section from the interior of the housing even during production. The sensor section is accordingly always protected from contamination with for example product dust in the interior of the production apparatus. Only the transmitting and/or receiving section comes into contact with the product dust. However, it is highly suitable for wet cleaning together with the other components in the interior of the housing due to its sufficient protection class of for example at least IP54 or at least IP67 and its preferably smooth surface, and can accordingly be decontaminated before removing the sensor from the housing interior. Involved cleaning of the sensor section is contrastingly unnecessary due to the protection by the sealing sleeve.

In an embodiment, an interface is realized for introducing and removing highly sensitive sensors into and out of the housing of a production apparatus. The sealing sleeve reliably protects not just the sensor section but also an operator removing the sensor from the housing interior. The sensor section is reliably protected both against dust as well as against liquid. Accordingly, PAT sensors can be used reliably and easily even under containment conditions. Compared to an otherwise necessary time-consuming cleaning of the sensor section, this results in considerable time savings. The transport of the removed sensor for example into a cleaning room is significantly simplified by the sealing container. Introducing and removing the sensor is possible before, during and after a production process in the production apparatus. The sensor assembly according to the invention can also be easily retrofitted in existing production apparatuses. Only an access opening is needed like containment production apparatuses normally have in any case, however, for example in the form of rapid transfer ports. In the interior of the housing, the sensor can for example can be arranged on a filling apparatus for filling a die plate of a rotary tablet press with powder product. The sensor can be arranged both in a filling pipe, a filling funnel, or a filling chamber of such a filling apparatus. An arrangement is however also conceivable on any other positions of the production apparatus, for example on a scraping apparatus of a rotary tablet press where the already finished tablets are then monitored. Any desired sensor assemblies are also possible in capsule filling machines or isolators.

According to one embodiment, the sealing section and the first end of the sealing sleeve can each be configured to be annular, wherein the first end of the sealing sleeve is clampingly held on the sealing section. The clamping hold can for example be achieved in that the diameter of the first end of the flexible sealing sleeve is somewhat smaller than the diameter of the sealing section. The first end of the sealing sleeve can then be drawn over the sealing section by elastic expansion, wherein the first end of the sealing sleeve clampingly engages with the sealing section after reshaping in the direction of the initial diameter. As already mentioned, a sealing ring, for example an O-ring, can be provided for an additionally improved seal on the sealing section and/or on the first end of the sealing sleeve. Of course, it would also be conceivable for the first end of the sealing sleeve to be permanently fastened to the sealing section, for example welded or the like.

The second end of the sealing sleeve can also be configured to be annular according to another embodiment, wherein the second end of the sealing sleeve is clampingly held on the sealing container. The second end of the sealing sleeve can for example have a sealing ring, for example an O-ring, that is clampingly held by means of a clamping ring between the first end of the sealing container and a connection flange of the access opening of the housing of the production apparatus. This results in a particularly good seal. The sealing ring can for example be welded in the sealing sleeve.

As already mentioned and known per se, the first end of the sealing container and the access opening of the housing can form a so-called rapid transfer port. A rapid transfer port is a quick exchange system, or respectively transfer system with which components can be inserted into, or respectively removed out, of a sealed room contamination-free, in this case the interior of the housing. A first connection port is formed on the access opening of the housing. A second connection port is formed on the movable sealing container. By means of the second connection port, the sealing container can be docked to the first connection port and therefore the housing. Such rapid transfer ports moreover normally have glove ports with which it is possible to open the first connection port from the interior of the housing without breaching the containment of the housing. Undocking the sealing container using the second connection port is only possible when the access opening of the housing, in particular the first connection port, is closed. The second connection port on the sealing container is also usually sealed tight. The sealing container therefore has in particular a closing flap with which it is tightly closed when the access opening of the housing of the production apparatus is closed so that dust exiting the sealing container and therefore contamination of the environment, or respectively endangerment of an operator, is avoided when the sealing container is disconnected from the housing.

As already explained, supply and/or sensor signal lines can be sealingly guided through a second end of the sealing container and connected to the sensor section. For example, a cover closing the second end of the sealing container can have a tight cable feedthrough. It can for example possess a protection class of at least IP54 or at least IP67. The supply line can be an electrical supply line for electrically supplying the sensor section. The sensor signal line can for example be a fiber-optic cable for electromagnetic radiation from a spectroscopic sensor.

If the sensor is a spectroscopic sensor, preferably an NIR sensor (near-infrared sensor), particularly good measuring results can be achieved, for example when measuring powder product processed in a rotary tablet press, or when measuring tablets generated in a rotary tablet press. In particular, active ingredient compositions can be reliably checked with spectroscopic sensors.

According to another embodiment, a second end of the sealing container can have a closing apparatus that sealingly closes the second end of the sealing container when in a closed state, and that can be opened for an access to the interior of the sealing container. With such a second tight access opening, it is possible to remove for example supply and/or signal lines from the sealing container after being detached from the sensor still located in the sealing container. The lines do not have to be also correspondingly transported into a cleaning room, which significantly simplifies handling. The sensor can also be transferred into and out of the sealing container through the closing apparatus for the second end of the sealing container, also without having to remove the sealing container from the housing of the tablet press. This additionally facilitates the transfer. When the sensor is removed from the sealing container, it is for example conceivable to disconnect the sealing sleeve from the second end of the sealing sleeve remaining on the sealing container by using a clip-and-cut method, or respectively a heat-seal-and-cut method, without product being able to escape from the sealing sleeve into the environment. In a clip-and-cut or heat-seal-and-cut method, the sealing sleeve is cut while simultaneously tightly sealing the cut ends. The contaminated transmission and/or receiving section of the sensor is then reliably sealed with a correspondingly shorter sealing hose, and can be reliably brought into a cleaning room for subsequent cleaning. According to a particularly practical embodiment, the sealing sleeve comprises a flexible plastic. The sealing container can for example be a cylindrical or cuboid sealing container.

The invention also relates to a production apparatus that, in an embodiment, comprises a housing with an access opening, and further comprises at least one sensor assembly according to the invention. As already mentioned, the production apparatus can be a containment production apparatus. It can in particular comply with a containment level according to OEB 3 or higher measured according to the SMEPAC test.

As already mentioned, the production apparatus can be a tablet press or a capsule filling machine, or an isolator for a tablet press or a capsule filling machine.

It can moreover be provided that the tablet press is a rotary tablet press comprising a rotor that can be rotated by means of a rotary drive, wherein the rotor has an upper punch guide for upper punches of the rotary tablet press, a lower punch guide for lower punches of the rotary tablet press and a die plate arranged between the punch guides, wherein the punches interact with cavities of the die plate, furthermore comprising a filling apparatus by means of which powder material to be pressed is added to the cavities of the die plate, furthermore comprising at least one upper pressing apparatus and at least one lower pressing apparatus that, during operation, interact with the upper punches and the lower punches such that they press the powder material in the cavities of the die plate, furthermore comprising an ejection apparatus in which tablets generated in the cavities are ejected. Possible embodiments of the rotary tablet press have already been explained above.

In an embodiment, a method for transferring a sensor into a housing of a production apparatus having a sensor assembly is provided. The method comprises connecting supply and/or sensor signal lines to the sensor section of the sensor. The sealing sleeve is sealingly fastened by its first end to the sealing section of the sensor, and is sealingly fastened by its second end to the sealing container. The sensor is inserted with the sealing sleeve into the sealing container and the sealing container is sealingly fastened by its first end to the access opening of the housing of the production apparatus. The access opening of the housing of the production apparatus is opened, and from the interior of the housing, the sensor is removed from the sealing container and transferred into the interior of the housing. The supply and/or control lines can be connected through the second end of the sealing container to the sensor section as already explained above.

In an embodiment, a method for transferring a sensor out of a housing of a production apparatus having a sensor assembly is provided. The method comprises transferring the sensor from the interior of the housing into the sealing container, and closing the access opening of the housing. The sealing container with the sensor is disconnected from the access opening of the housing, and the sensor is removed from the sealing container. An embodiment of a method for transferring a sensor out of a housing of a production apparatus having a sensor assembly is provided and comprises transferring the sensor from the interior of the housing into the sealing container and closing the access opening of the housing. The second end of the sealing container is opened by opening the closing apparatus. Through the second end of the sealing container, supply and/or sensor signal lines are disconnected from the sensor section and removed from the sealing container. Through the second end of the sealing container, the sensor is removed from the sealing container, or the sealing container with the sensor is disconnected from the access opening of the housing, and the sensor is removed from the sealing container.

In an embodiment, the sensor can be removed from the sealing container through the second end of the sealing container without disconnecting the sealing container from the housing. It is however also possible to disconnect the sealing container together with the sensor from the housing and to remove the sensor, for example afterward, from the sealing container.

In the methods according to the invention, the method steps can be performed in the sequence of the listing in the method claims. This is however not essential. The methods can also be performed with the production apparatus according to the invention. The methods can moreover be performed with the sensor assembly according to the invention, or respectively the production apparatus according to the invention according to each embodiment explained with respect to the sensor assembly, or respectively the production apparatus.

According to another embodiment, in the methods for transferring the sensor out of the housing of the production apparatus, the interior of the press housing can be cleaned with a cleaning liquid before transferring the sensor into the sealing container. The housing interior is cleaned of contaminations from product residues by such a wet cleaning. For example, rotary tablet presses of this kind are also termed WIP rotary tablet presses (wash-in-place rotary tablet presses). As mentioned, the transmitting and/or receiving section can possess a high protection class, for example at least IP54 or at least IP67, so that wet cleaning is easily possible. As already mentioned, it can also possess a smooth outer surface which makes the surface easy to clean. The sensor section which is more difficult to clean is contrastingly protected from contamination by the sealing sleeve and correspondingly does not have to be cleaned in a time-consuming manner during wet cleaning.

In the methods according to the invention for transferring the sensor out of the housing of the production apparatus, the sealing sleeve can also be cut and sealed when the sensor is in a removed state from the sealing container so that the sensor can be disconnected from the second end of the sealing sleeve fastened to the sealing container. This has already been explained above. So-called cut-and-clip methods or heat-seal-and-cut methods can be used.

BRIEF DESCRIPTION OF THE DRAWINGS

An exemplary embodiment of the invention is explained below in greater detail with reference to figures. Schematically.

The same reference numbers refer to the same objects in the figures unless indicated otherwise.

DETAILED DESCRIPTION OF THE INVENTION

Figure 1:
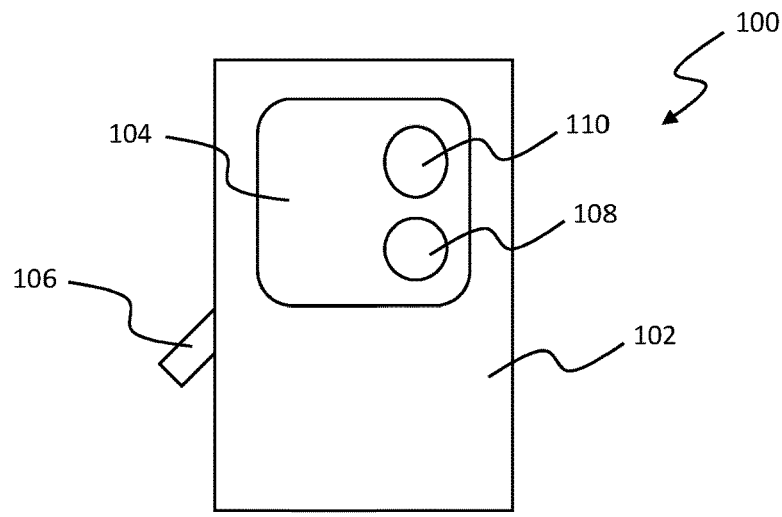
FIG. 1 illustrates a side view of an embodiment of a production apparatus.

FIG. 1 schematically shows a production apparatus 100, in the present case a rotary tablet press 100. The rotary tablet press 100 has a housing 102 that, in the present case, ensures a seal against the exit of product dust into the environment. For example, the rotary tablet press 100 can be a containment press, for example according to OEB level 3 or higher measured according to the SMEPAC test. A viewing window 104 is formed in the housing 102. Moreover, an outlet of the rotary tablet press 100 for a tablet generated therein can be seen at reference number 106. An access opening 108 is formed in the viewing window 104 that in the present case forms a rapid transfer port. An additional access opening 110 is also formed in the viewing window. Moreover, so-called glove ports can be provided in a manner known per se with which tasks can be performed in the interior of the housing 102 by an operator while maintaining the containment.

An example of a configuration of such a rotary tablet press will be explained with reference to FIG. 2. The depicted rotary tablet press comprises a rotor 11 that is rotationally driven by a rotary drive (not shown) with a die plate 10 which has a plurality of cavities 12. The cavities 12 can for example be formed by holes in the die plate 10. The rotor 11 further comprises a plurality of upper punches 14 guided in an upper punch guide 13 and a plurality of lower punches 16 guided in a lower punch guide 15, which rotate synchronously with the die plate 10. In each case, a pair consisting of an upper punch 14 and a lower punch 16 is assigned to a cavity 12. The axial movement of the upper punches 14 and lower punches 16 during the rotation of the rotor 11 is controlled by upper control cam elements 18 and lower control cam elements 20. The rotary tablet press moreover comprises a filling apparatus 22 which has a filling chamber 24. The filling apparatus 22 moreover comprises a funnel-shaped filling material reservoir 26 which is connected by a filling pipe 28 to the filling chamber 24. In this manner, the powdered filling material in the present example passes under the force of gravity via the filling pipe 28 into the filling chamber 24, and passes therefrom via a filling opening provided in the bottom side of the filling chamber 24 into the cavities 12 of the die plate 10, again under the force of gravity.

Moreover, the rotary tablet press comprises a pressing apparatus 30. The pressing apparatus 30 possesses a pre-pressing apparatus with an upper pre-pressing roller 32 and a lower pre-pressing roller 34, as well as a main pressing apparatus with an upper main pressing roller 36 and a lower main pressing roller 38. Furthermore, the rotary tablet press comprises an ejection apparatus 40, in the present case with a scraper 42 which supplies the tablets 44 produced in the rotary tablet press to a tablet discharge 46.

An evaluation and control apparatus 48 controls operation of the rotary tablet press and is connected, inter alia, to the rotary drive of the rotor 11 by lines (not shown).

Figure 2:
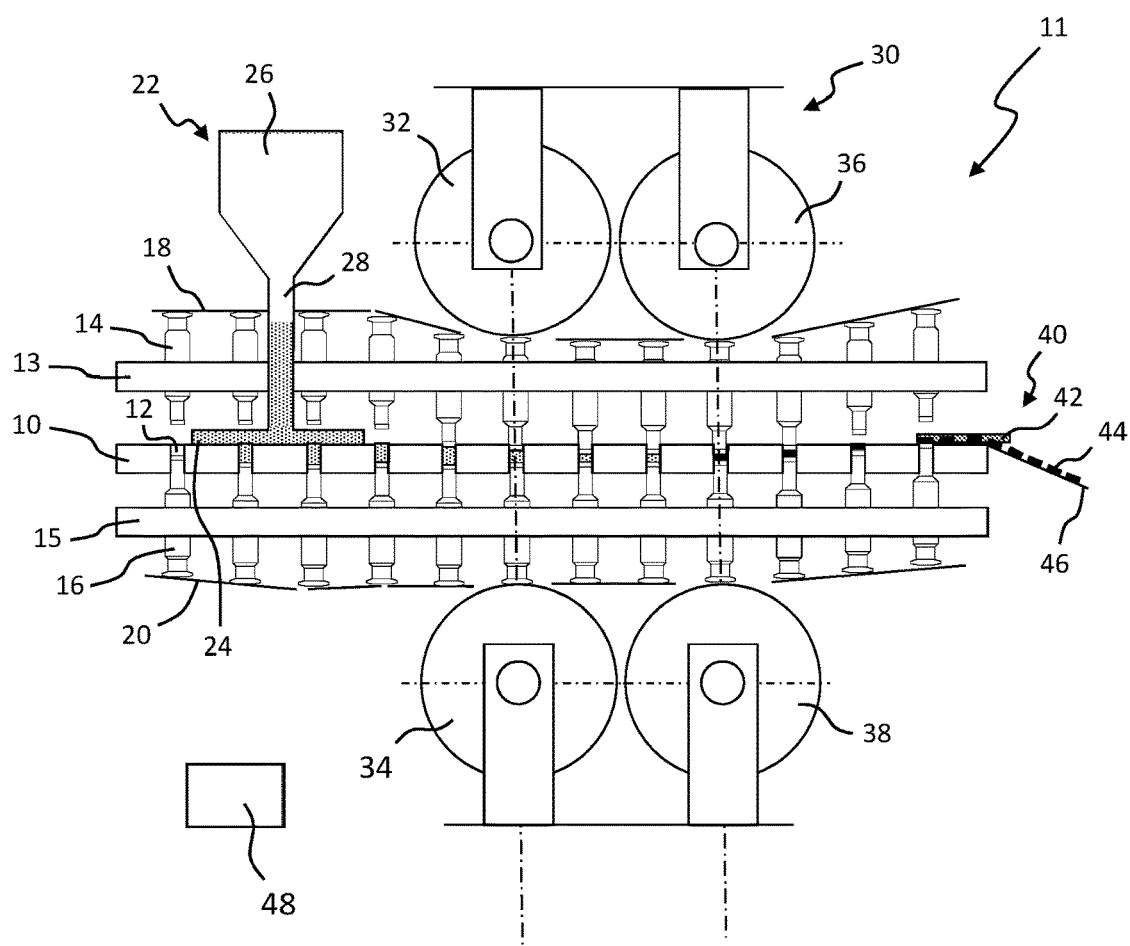
FIG. 2 illustrates a side view of an embodiment of a portion of the production apparatus of FIG. 1.
Figure 3:
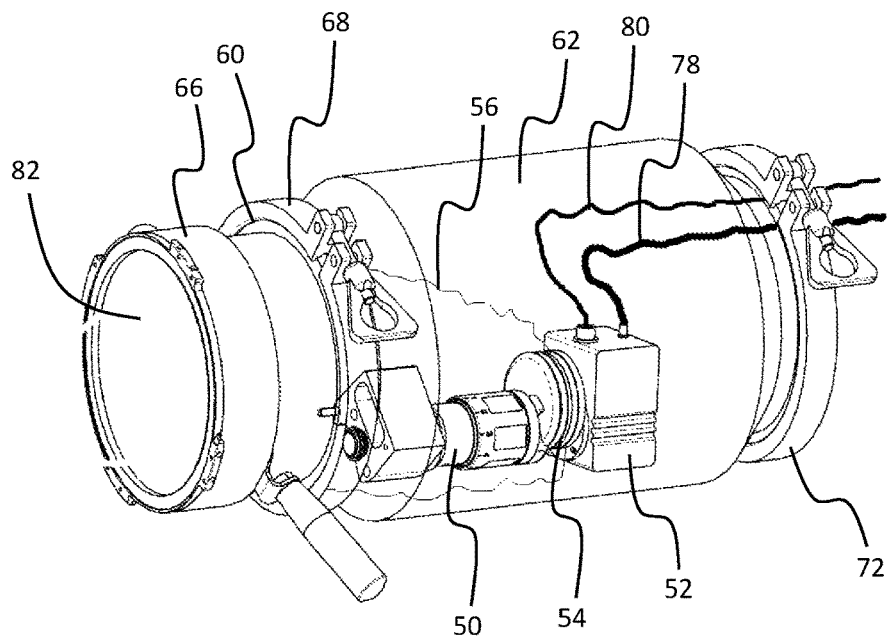
FIG. 3 illustrates a perspective view of an embodiment of a sensor assembly in a first operating state.

FIG. 3 shows an embodiment of a sensor assembly for a production apparatus, for example for the rotary tablet press 100 from FIGS. 1 and 2. As shown the sensor assembly comprises a sensor with a transmitting and/or receiving section 50 configured to transmit and/or receive sensor signals, as well as a sensor section 52. Between the transmitting and/or receiving section 50 and the sensor section 52, an annular sealing section 54 is arranged on which a sealing sleeve 56 with a first annular end 58 (FIG. 7) is sealingly held, clamped in the present case. A second, also annular, end 60 of the sealing sleeve 56 is held, also clamped, on a sealing container 62 accommodating the sensor. As can be seen in particular in FIG. 7, a sealing ring 64 is arranged, for example welded, on the second end 60 of the sealing sleeve 56 and is held by clamping between a front wall of the sealing container 62 forming a first end of the sealing container 62, and a connection flange 66 of the access opening 108 of the housing 102 of the production apparatus, in the present case by means of a clamping ring 68. The opposite second end of the sealing container 62 has a closing apparatus in the form of a closing flap 70 that is also tightly fastened by clamping to a face wall of the sealing container 62 forming the second end by means of a clamping ring 72 and a sealing ring 74. The closing flap 70 has a tight cable feedthrough 76 through which a fiber-optic cable 78 and an electrical supply line 80 are guided and connected to the sensor section 52 in the shown example. It can also be seen in FIG. 7 that the transmitting and/or receiving section 50 has a cylindrical transmitter and/or receiver 51 and a support section 53 that supports it. By means of the support section 53, the position of the transmitter and/or receiver 51 can be adjusted in a longitudinal direction, to the left and right in FIG. 7. In this manner, the transmitter and/or receiver 51 can be precisely moved to the desired position in the interior of the housing.

Figure 4:
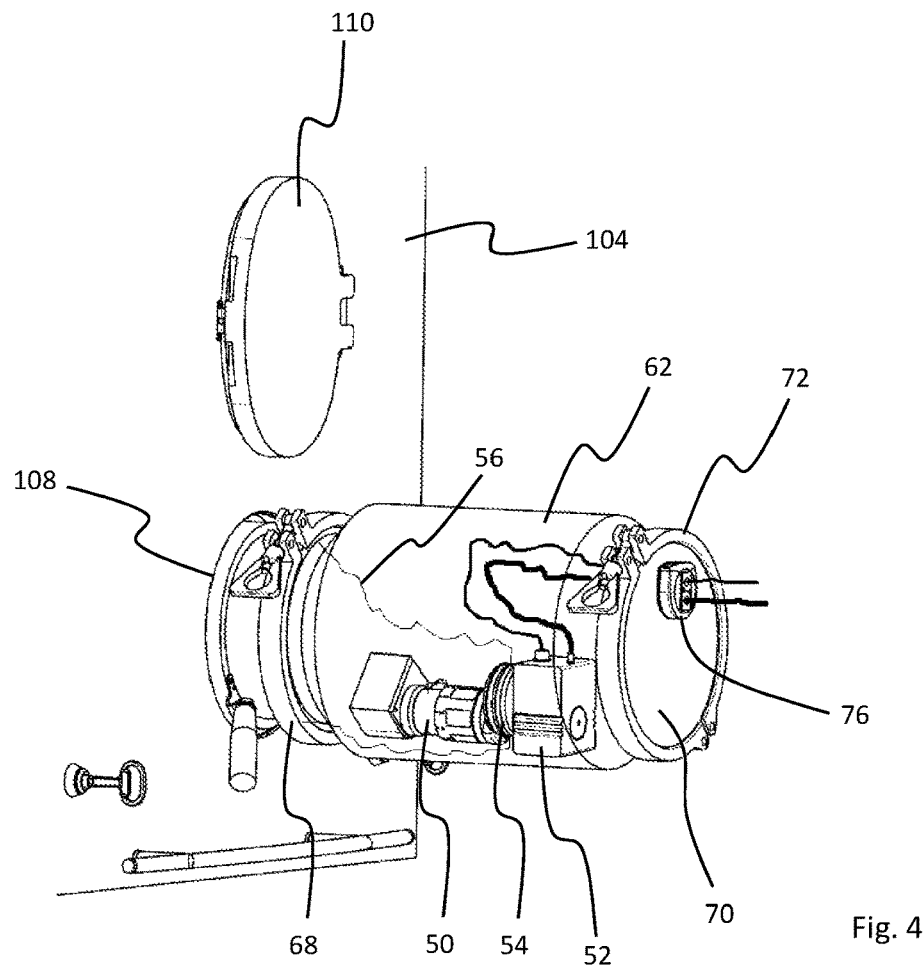
FIG. 4 illustrates a perspective view of the embodiment of the sensor assembly from FIG. 3 in a second operating state.
Figure 5:
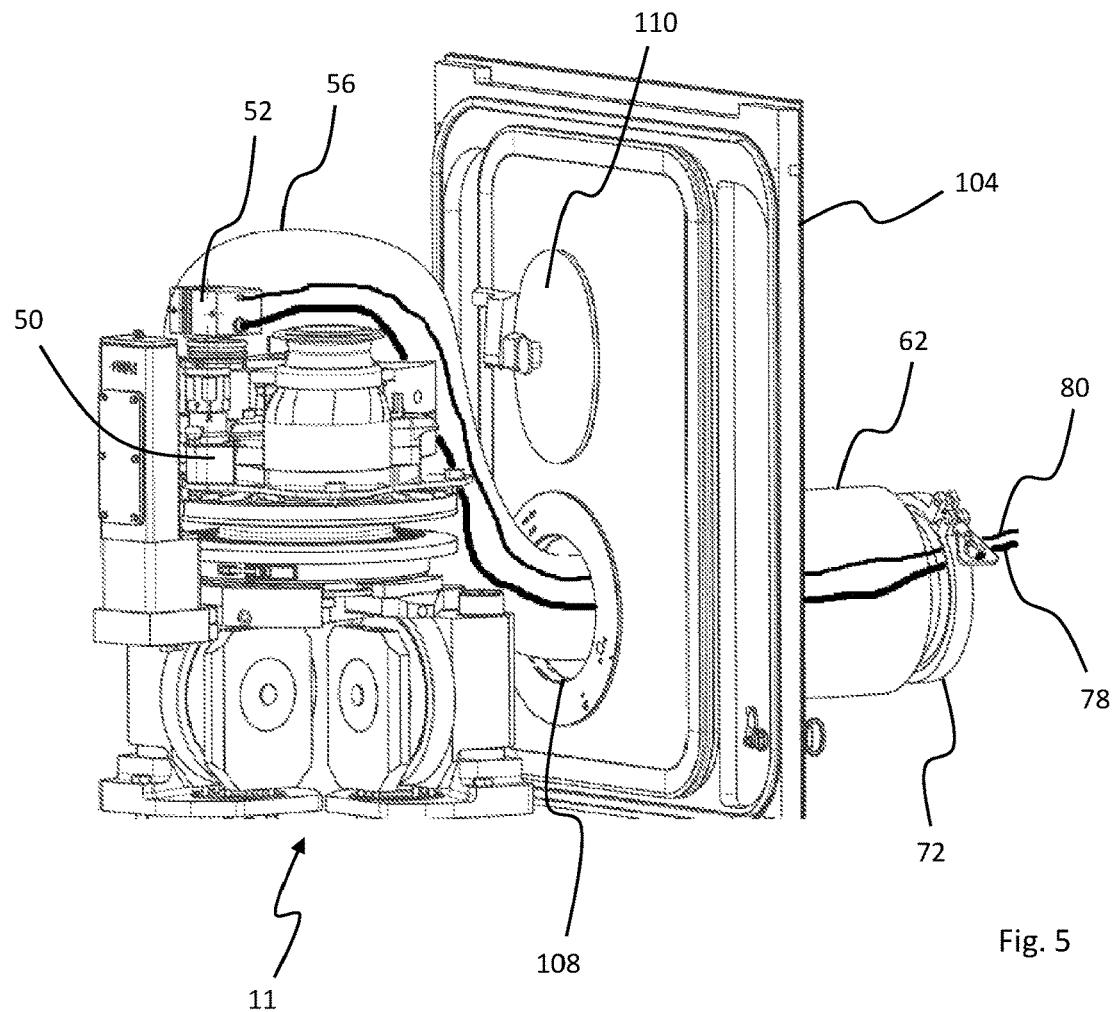
FIG. 5 illustrates a perspective view of the embodiment of the sensor assembly from FIG. 3 in a third operating state.

To transfer the sensor into the interior of the housing 102 of the production apparatus 100, the fiber-optic cable 78 and the electrical supply line 80 are first guided through the cable feedthrough 76 and connected to the sensor section 52 of the sensor. The sealing sleeve 56 is sealingly fastened by its first end 58 (FIG. 7) to the annular sealing section 54, and by its second end 60 to the first end of the sealing container 62. This fastening can occur while placing the sealing container 62 on the access opening 108 of the housing 102. Before placement, the sensor is inserted with the sealing sleeve 56 as well as the fiber-optic cable 78 and the supply line 80 into the sealing container 62. The state of the sealing container 62 when placed on the housing 102 is shown in FIG. 4. Then the closing opening in the form of the rapid transfer port is opened, for example using the explained glove ports, from the interior of the housing 102, wherein a corresponding closing flap 82 on the sealing container 62 is also opened to produce a passage between the interior of the sealing container 62 and the interior of the housing 102. Then the sensor can in turn be transferred for example using the glove ports from the interior of the housing 102 out of the sealing container 62 into the interior of the housing 102 and arranged at the desired position in the interior of the housing 102, for example on the filling apparatus 22. While transferring the sensor, the sealing sleeve 56 is inverted. The state of the sensor arranged in the interior of the housing 102 is shown in FIG. 5. It should be noted that the rotor 11 of the rotary tablet press in FIG. 5 is only partially shown for reasons of clarity. It is in particular clear from a comparison of FIGS. 4 and 5 that the sensor section 52 is always protected by the sealing sleeve 56 from contamination from powder product located in the interior of the housing 102 during the transfer and when in an inserted state.

Figure 6:
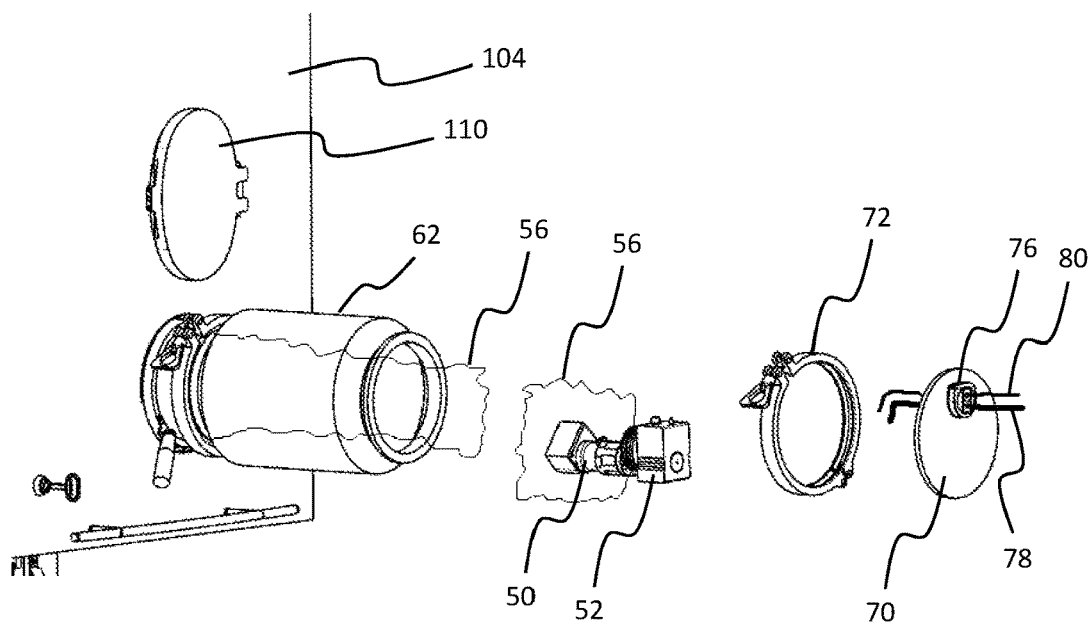
FIG. 6 illustrates a perspective view of the embodiment of the sensor assembly from FIG. 3 in a fourth operating state.

In reverse sequence, the sensor can again be transferred out of the interior of the housing 102. In particular, again for example using the glove ports, the sensor can be transferred from the interior of the housing back into the sealing container 62. Then the closing opening 108 and therefore also the closing flap 82 of the sealing container 62 is tightly closed. Subsequently, first by disconnecting the clamping ring 72 on the second end of the sealing container 62, the closing flap 70 can be opened so that the supply line 80 and the fiber-optic cable 78 can be disconnected from the sensor section 52. Subsequently, the sensor can be removed from the sealing container 62, for example still arranged on the housing 102, through the second end. In order to be able to remove the sensor without also disconnecting the second end of the sealing sleeve 56 from the sealing container 62 and for example clean it at a separate location, the sealing sleeve 56 can for example be cut using a clip-and-cut or heat-seal-and-cut method and thereby closed as shown in FIG. 6. The sensor can therefore be easily transported with the sealing hose 56 that is smaller from being cut, for example into a cleaning room where the transmitting and receiving section 50 of the sensor coming into contact with the powder product can be cleaned.

Figure 7:
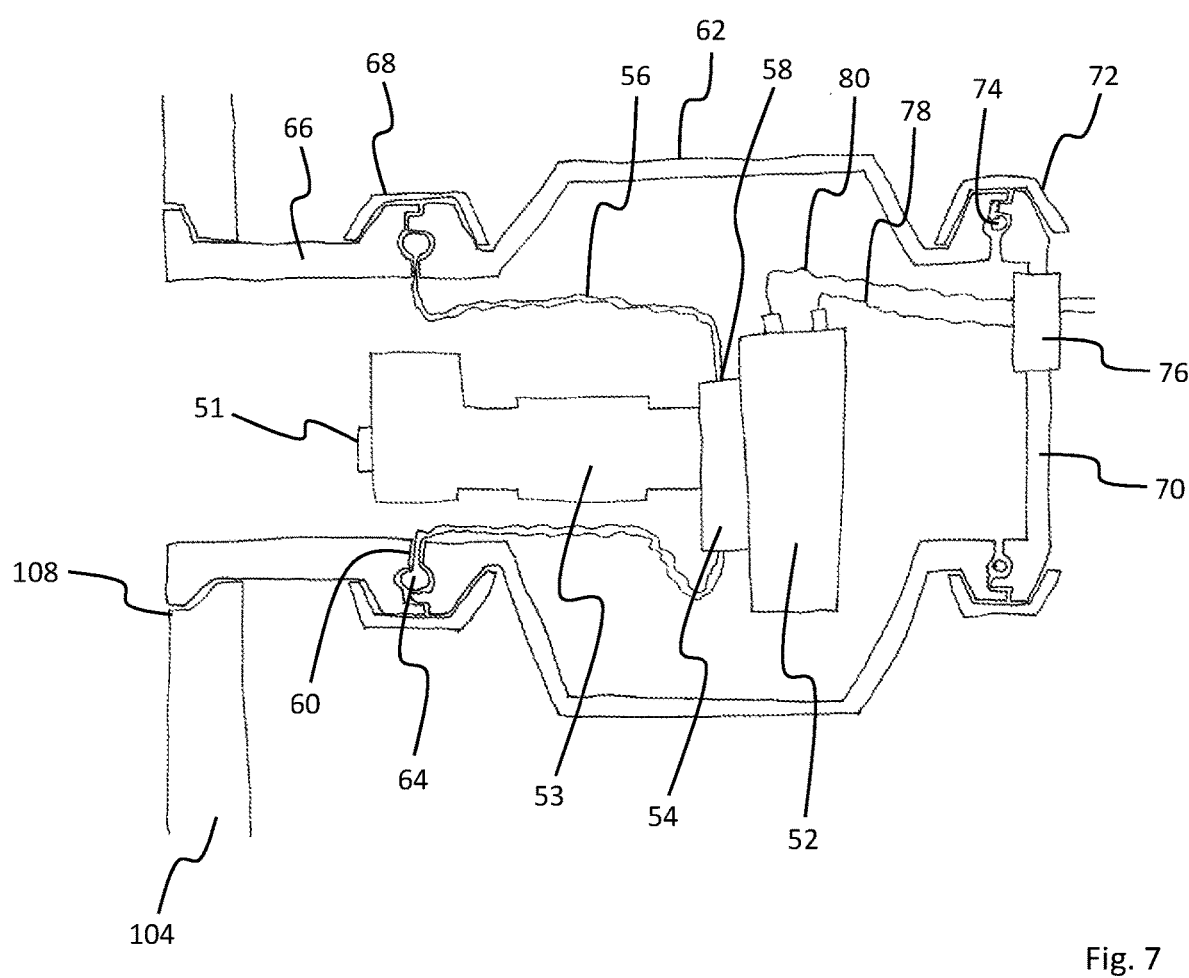
FIG. 7 illustrates a sectional view of the embodiment of the embodiment of the sensor assembly from FIG. 3.

It should be noted that for reasons of clarity, some components in the illustration in FIG. 7 are shown simplified in comparison to the illustrations in FIGS. 3 to 6, such as the transmitting and/or receiving section 50. Actually, they are in particular the same components.

LIST OF REFERENCE SIGNS

Die plate
Rotor
Cavities

Upper punch guide
Punch
Lower punch guide
Punch
Upper control cam element
Lower control cam element
Filling apparatus
Filling chamber
Filling material reservoir
Filling pipe
Pressing apparatus
Upper pre-pressing roller
Lower pre-pressing roller
Upper main pressing roller
Lower main pressing roller
Ejection apparatus
Scraper
Tablet
Tablet discharge
Evaluation and control apparatus
Transmitting and/or receiving section
Transmitter and/or receiver
Sensor section
Support section
Sealing section
Sealing sleeve
First end of the sealing sleeve
Second end of the sealing sleeve
Sealing container
Sealing ring
Connection flange
Clamping ring
Closing flap
Clamping ring
Sealing ring
Cable feedthrough
Fiber-optic cable
Supply line
Closing flap
Production apparatus/rotary tablet press
Housing
Viewing window
Outlet of the rotary tablet press
Access opening
Access opening

The invention claimed is:

1. A sensor assembly for a production apparatus including a housing defining one or more access openings, the sensor assembly comprising:
a sensor, wherein the sensor comprises,
a sensor portion configured to at least one of (1) transmit, and (2) receive sensor signals,
a sensor section,
a sealing section positioned between the sensor portion and the sensor section,
a sealing sleeve sealingly fastened by a first end,
a sealing container configured to be sealingly fastened by a first end to an access opening of a housing of a production apparatus,
wherein the sensor is configured to be accommodated in the sealing container for a transfer into and out of the housing,
wherein, when the sealing container is fastened to one of the one or more access openings of housing, the sealing sleeve is sealingly fastened by a second end to the sealing container to enable the sensor to be transferred between the sealing container and an interior of the housing and
wherein the sealing sleeve is configured to provide a tight separation between the sensor section and the interior of the housing during transfer of the sensor.

2. The sensor assembly according to claim 1, wherein the sealing section and wherein the first end of the sealing sleeve are annular, and wherein the first end of the sealing sleeve is clampingly held on the sealing section.

3. The sensor assembly according to claim 1, wherein the second end of the sealing sleeve is annular, and wherein the second end of the sealing sleeve is clampingly held on the sealing container.

4. The sensor assembly according to claim 3, wherein the second end of the sealing sleeve has a sealing ring that is clampingly held by a clamping ring between the first end of the sealing container and a connection flange of the one or more access openings of the housing of the production apparatus.

5. The sensor assembly according to claim 1, wherein the first end of the sealing container and the one or more access openings of the housing form a rapid transfer port.

6. The sensor assembly according to claim 1, wherein at least one of (1) supply lines, and (2) sensor signal lines, are sealingly guided through a second end of the sealing container and are connected to the sensor section.

7. The sensor assembly according to claim 1, wherein the sensor is a spectroscopic sensor.

8. The sensor assembly according to claim 1, wherein a second end of the sealing container comprises a closing apparatus configured to sealingly close the second end of the sealing container to define a closed state, and wherein the closing apparatus is configured open to enable access to the sealing container.

9. The sensor assembly according to claim 1, wherein the sealing sleeve comprises a flexible plastic.

10. The sensor assembly according to claim 1, wherein the sealing container comprises one of (1) a cylindrical, and (2) a cuboid sealing container.

11. A production apparatus comprising:
a housing defining an access opening; and
at least one sensor assembly according to claim 1.

12. The production apparatus according to claim 11, wherein the production apparatus is a containment production apparatus.

13. The production apparatus according to claim 11, wherein the production apparatus is one of (1) a tablet press, (2) a capsule filling machine, (3) an isolator for a tablet press, and (4) a capsule filling machine.

14. The production apparatus according to claim 13, wherein the tablet press is a rotary tablet press comprising a rotor configured be rotated by means of a rotary drive, wherein the rotor comprises,
an upper punch guide configured to guide upper punches of the rotary tablet press,
a lower punch guide configured to guide lower punches of the rotary tablet press, and
a die plate positioned between the upper punch guide and the lower punch guide and defining a plurality of cavities, wherein the upper punches and the lower punches interact with the plurality of cavities,
a filling apparatus configured to add powder material to the plurality of cavities of the die plate,
at least one upper pressing apparatus and at least one lower pressing apparatus, wherein during operation, the upper pressing apparatus is configured to interact with the upper punches and the lower pressing apparatus is configured to interact with the lower punches in order to press the powder material in the cavities of the die plate, and an ejection apparatus in which tablets generated in the cavities are ejected.

15. A method of transferring a sensor of a production apparatus with a sensor assembly positioned in a housing, the method comprising:

connecting at least one of (1) supply lines, and (2) sensor signal lines to a sensor section of the sensor;

sealingly connect a first end of a sealing sleeve to a sealing section of the sensor;

sealingly connect a second end of the sealing sleeve to a sealing container;

inserting the sensor with the sealing sleeve into the sealing container;

sealingly connect a first end of the sealing container to an access opening defined by the housing of the production apparatus;

opening the access opening of the housing of the production apparatus; and transferring the sensor from the sealing container to an interior of the housing.

16. The method according to claim 15, further comprising:

closing the access opening of the housing;

disconnecting the sealing container housing the sensor from the access opening of the housing; and removing the sensor from the sealing container.

17. A method of transferring a sensor of a production apparatus with a sensor assembly positioned in a housing, the method comprising:

transferring the sensor from an interior of the housing into a sealing container;

closing an access opening defined by the housing;

opening a second end of the sealing container is opened by opening a closing apparatus, disconnecting and removing at least one of (1) supply lines, and (2) sensor signal lines through the second end of the sealing container; and one of: (1) removing the sensor from the sealing container through the second end of the sealing container, and (2) disconnecting the sealing container containing the sensor from the access opening and removing the sensor from the sealing container.

18. The method according to claim 16, wherein the interior of the housing is cleaned with a cleaning liquid before transferring the sensor into the sealing container.

19. The method according to claim 16, wherein the sealing sleeve is cut and sealed when the sensor is removed from the sealing container so that the sensor can be disconnected from the second end of the sealing sleeve fastened to the sealing container.

\* \* \* \* \*